United States Patent
Toosi et al.

(10) Patent No.: US 8,861,620 B2
(45) Date of Patent: Oct. 14, 2014

(54) FULL BAND CABLE RECEIVER

(71) Applicant: SiTune Corporation, San Jose, CA (US)

(72) Inventors: Vahid Mesgarpour Toosi, Mountain View, CA (US); Mahdi Khoshgard, San Jose, CA (US); Saeid Mehrmanesh, San Jose, CA (US)

(73) Assignee: SiTune Corporation, San Jose, CA (US)

( * ) Notice: Subject to any disclaimer, the term of this patent is extended or adjusted under 35 U.S.C. 154(b) by 77 days.

(21) Appl. No.: 13/650,989

(22) Filed: Oct. 12, 2012

(65) Prior Publication Data

US 2013/0101012 A1  Apr. 25, 2013

Related U.S. Application Data

(60) Provisional application No. 61/547,591, filed on Oct. 14, 2011.

(51) Int. Cl.
| | |
|---|---|
| H04L 25/00 | (2006.01) |
| H04B 1/26 | (2006.01) |
| H04L 5/06 | (2006.01) |
| H04L 25/03 | (2006.01) |
| H04L 27/00 | (2006.01) |

(52) U.S. Cl.
CPC .......... *H04L 25/03* (2013.01); *H04L 2027/0016* (2013.01); *H04L 5/06* (2013.01)
USPC ........................................ 375/257; 455/196.1

(58) Field of Classification Search
CPC ...... H04L 25/0272; H04L 27/06; H04L 27/38
USPC ................. 375/257, 332, 350, 316, 345; 455/196.1, 264, 324; 330/124 R
See application file for complete search history.

(56) References Cited

U.S. PATENT DOCUMENTS

| | | | |
|---|---|---|---|
| 2005/0253663 A1* | 11/2005 | Gomez et al. | 333/100 |
| 2008/0112519 A1* | 5/2008 | Jung et al. | 375/350 |
| 2010/0127906 A1* | 5/2010 | Yamaguchi et al. | 341/131 |
| 2011/0133784 A1* | 6/2011 | Yuan et al. | 327/77 |
| 2012/0021699 A1* | 1/2012 | Mikhemar et al. | 455/75 |

\* cited by examiner

*Primary Examiner* — Khai Tran

(74) *Attorney, Agent, or Firm* — Novak Druce Connolly Bove + Quigg LLP

(57) ABSTRACT

Systems and methods are described for the implementation of a full band cable receiver by using a combination of tuners (e.g., ultra-low power Tuners) and Analog-to-Digital Converters (ADCs) to attain the goal of digitization with reduced power and/or cost. The full-band capture cable receiver can overcome the constraints of conventional cable receiver systems and deliver multiple channels, thereby allowing operators to provide consumers with an increased number of services.

20 Claims, 6 Drawing Sheets

500

| LO# | Frequency | LO Source |
|---|---|---|
| LO1 | 120 MHz | LO8 / 8 (960 MHz / 8) |
| LO2 | 240 MHz | LO8 / 4 (960 MHz / 4) |
| LO3 | 360 MHz | LO6 / 2 (720 MHz / 2) |
| LO4 | 480 MHz | LO8 / 2 (960 MHz / 2) |
| LO5 | 600 MHz | Synthesizer #4 (600 MHz) |
| LO6 | 720 MHz | Synthesizer #2 (720 MHz) |
| LO7 | 840 MHz | Synthesizer #3 (840 MHz) |
| LO8 | 960 MHz | Synthesizer #1 (960 MHz) |

| Segment # | RF Frequency Range | | LO | BB Frequency Range | | |
|---|---|---|---|---|---|---|
| | Left Edge | Right Edge | | Left Edge | Right Edge | Bandwidth |
| Segment 1 | 54 MHz | 180 MHz | 120 MHz | -66 MHz | +60 MHz | 66 MHz |
| Segment 2 | 180 MHz | 300 MHz | 240 MHz | -60 MHz | +60 MHz | 60 MHz |
| Segment 3 | 300 MHz | 420 MHz | 360 MHz | -66 MHz | +60 MHz | 66 MHz |
| Segment 4 | 420 MHz | 540 MHz | 480 MHz | -60 MHz | +60 MHz | 60 MHz |
| Segment 5 | 540 MHz | 660 MHz | 600 MHz | -66 MHz | +60 MHz | 66 MHz |
| Segment 6 | 660 MHz | 780 MHz | 720 MHz | -60 MHz | +60 MHz | 60 MHz |
| Segment 7 | 780 MHz | 900 MHz | 840 MHz | -66 MHz | +60 MHz | 66 MHz |
| Segment 8 | 900 MHz | 1002 MHz | 960 MHz | -60 MHz | +42 MHz | 60 MHz |

FIG. 6

FULL BAND CABLE RECEIVER

CLAIM OF PRIORITY

This patent application claims priority to U.S. Provisional Patent Application No. 61/547,591 filed on Oct. 14, 2011, by Vahid Mesgarpour Toosi et al., entitled "FULL BAND CABLE RECEIVER" which is incorporated by reference herein in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This invention relates generally to the field of radio frequency receivers, and more specifically to receivers for digitizing a cable signal.

BACKGROUND

In today's cable, television and telecommunications environments, cable carriers are striving to offer customers services with maximum added value and variety. At the same time, consumers are demanding devices and services that support an increasing number of simultaneous channels so they can have TV and high-speed Internet throughout the home, hundreds of HD broadcast channels, thousands of video-on-demand programs, multimegabit high bandwidth services, etc. Further, content is expected to be streamed to a variety of devices, including laptops, televisions, mobile devices, tablets, and personal computers. However, the scalability of traditional cable tuners for providing multiple simultaneous channels is limited due to constraints of size, cost, power consumption, and heat dissipation.

For example, in the case of the Data Over Cable Service Interface Specification 3.0 (DOCSIS 3.0) standard, cable carriers can bundle up to sixteen channels and deliver them to a customer. Since the video channels could be placed at any frequency in the cable 1 GHz band, and, because the switching time between the channels needs to be very short, and further considering that carriers will offer internet services with flexible speed, a single carrier may prefer to have access to sixteen, twenty four, thirty two or some other number of channels at the same time.

BRIEF DESCRIPTION OF THE DRAWINGS

Various embodiments in accordance with the present disclosure will be described with reference to the drawings, in which:

FIG. 5 illustrates an example of a table with LO frequencies obtained by using four synthesizers, in accordance with various embodiments; and FIG. 6 illustrates an example of dividing the entire cable TV band in the United States into eight segments, in accordance with various embodiments.

DETAILED DESCRIPTION

Figure 1:
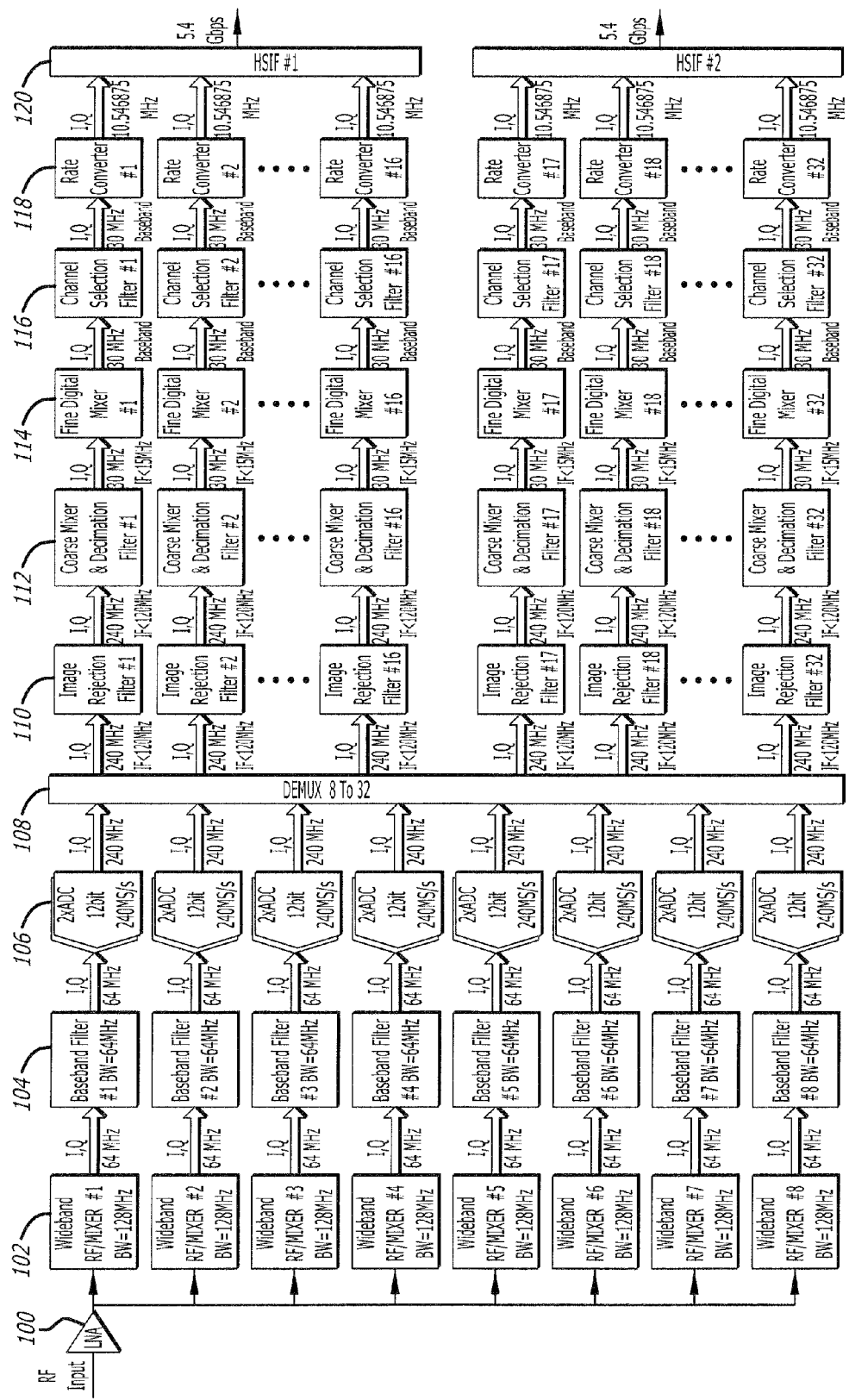
FIG. 1 illustrates an example of an architecture for a full-band capture cable receiver, including the DSP unit details, in accordance with various embodiments.

In the following description, various embodiments will be illustrated by way of example and not by way of limitation in the figures of the accompanying drawings. References to various embodiments in this disclosure are not necessarily to the same embodiment, and such references mean at least one. While specific implementations and other details are discussed, it is to be understood that this is done for illustrative purposes only. A person skilled in the relevant art will recognize that other components and configurations may be used without departing from the scope and spirit of the claimed subject matter.

Systems and methods in accordance with various embodiments of the present disclosure may overcome one or more of the foregoing or other deficiencies experienced in conventional approaches for constructing cable receivers. In particular, various embodiments describe systems and methods for the implementation of a full band cable receiver by using a combination of tuners (e.g., ultra-low power Tuners) and Analog-to-Digital Converters (ADCs) to attain the goal of digitization with reduced power and/or cost. The full-band capture cable receiver can overcome the constraints of conventional cable receiver systems and deliver multiple channels, thereby allowing operators to provide consumers with an increased number of services.

Conventionally, a cable receiver system is comprised of a radio frequency (RF) Tuner for the 50 MHz to 1 GHz band; a Quadrature Amplitude Modulation (QAM) demodulator, and a Media Processor. Implementing a cable receiver system with up to thirty two available channels could require implementing sixteen tuners, sixteen QAM demodulators, and a Media Processor with the capability of processing the concurrent sixteen channels. However, putting sixteen Tuners on one system board is both expensive and in some cases practically impossible due to limitations such as power dissipation and insufficient printed circuit board (PCB) area.

Another possibility may be to capture the entire 50 MHz to 1 GHz band, digitize it, and select sixteen to twenty four channels from the band to deliver those channels to the Media Processor. To implement this, very high speed, high resolution Analog to Digital Converters (ADCs) can be used to directly sample the RF signals with the bandwidth of 950 MHz (1 GHz-50 MHz=950 MHz), the desired channels can be selected, and the selected channels can be delivered to the digital processing unit. However, for cable systems with a QAM-256 modulation scheme, such a strategy would translate to ADC specs of more than 2 GHz of sampling frequency and more than 12 bit of effective number of bits (ENOB) performance. An ADC with this specification is either not possible or very difficult to achieve with the current state of the technology and if achieved, would likely consume a high amount of power.

In accordance with various embodiments described herein, to avoid these and other issues, embodiments are described in this patent application for using the combination of ultra-low power Tuners and ADCs to reach the same goal of digitization with less power and cost.

FIG. 1 illustrates an example of an architecture for a full-band capture cable receiver, including the DSP unit details, in accordance with various embodiments. In the illustrated embodiment, the cable RF signal is received to a low noise amplifier (LNA) 100 that amplifies the weak signal and feeds the amplified signal into eight separate wideband RF mixers, such as RF mixer 102. In this manner, the 950 MHz band (i.e., 50 MHz to 1 GHz band) is divided into eight asymmetric frequency segments. The center frequency and bandwidth of each segment can be determined based on standards such as J83.B, DVBC, or J83.A. Dividing the band into eight segments makes the specification of the ADC still challenging but within the scope of the high-speed sub-micro CMOS technologies such as the 65 nm/40 nm process.

From each mixer (e.g., mixer 102), the signal is provided to a baseband filter 104 and from the baseband filter 104, the signal is provided to two analog-to-digital converters (ADCs) 106. As illustrated in the figure, each ADC can be a 12 bit 240 MS/s ADC. From the two ADCs 106, the signal is routed to a demultiplexer (demux) 108 of the digital signal processor (DSP) unit, where the demultiplexer 108 takes the signals coming from the ADCs 106 and produces an 8-to-32 conversion of the signals. As used in this disclosure, a demultiplexer can include any device which takes an input signal carrying multiple channels and separates them over multiple output signals. As illustrated in FIG. 1, the demultiplexer 108 receives eight separate signals from the ADCs 106 and produces thirty two output signals.

In various embodiments, the digital portion (i.e., the DSP unit) of the full-band capture cable receiver can be divided into two sections: the Channelizer and the High-Speed Data Interface (HSIF) 120. The main tasks of the Channelizer can be: demultiplexing, image rejection, channel selection filtering, down-converting, and rate converting. The tasks of each component of the Channelizer are described in further detail below.

In accordance with an embodiment, the demultiplexer 108 can demultiplex eight different wideband in-phase quadrature (I/Q) signals to thirty two RF receiver channels. In other words, the demultiplexer 108 can contain a mapping from eight wideband tuners to thirty two RF channels. Note that, in this case, the first sixteen RF channels (i.e. signals coming from rate converters #1-#16) can go through the first HSIF and the second sixteen RF channels (i.e. signals coming from rate converters #17-#32) can go through the second HSIF. The output of the demultiplexer 108 is provided to an image rejection filter 110.

In accordance with an embodiment, the image rejection filter 110 can be used to estimate the IQ imbalance for each RF channel separately and to compensate for the IQ imbalance in that channel. In the illustrated embodiment, there are thirty two image rejection filters, such as filter 110. Note that the IQ imbalances caused in wideband tuners are different and, moreover, for every wideband tuner, the IQ imbalance could vary by 60 MHz in bandwidth. Therefore, there can be dedicated IQ imbalance estimators and compensators for all RF channels, even if some of them are located in the same wideband tuner.

From the image rejection filter 110, the signal is provided to a coarse mixer and decimation filter 112 and from the coarse mixer and decimation filter 112 to a fine digital mixer 114. This portion of the DSP can digitally mix and down-convert every RF channel that is located in an IF frequency to a baseband signal. This down-conversion can be done together with decimation filtering for the purpose of optimization. There can be thirty two different down-converters (digital mixers) to cover all thirty two RF channels. The down-converting of the signal will be described in further detail with reference to FIG. 2 below. The output of the fine digital mixer 114 is provided to a channel selection filter 116.

In accordance with an embodiment, a channel selection filter 116 can filter adjacent channels and all other interfering RF channels for each RF channel. This filtering can be primarily performed in one "Channel Select Filter" but some part of filtering can be done through the decimation filters and Half-band filters or other rate converting filters. The output of the channel selection filter 116 is provided to a rate converter 118.

In accordance with an embodiment, the rate converter 118 can perform fractional rate converting from the decimated baseband signal to a desired rate for the demodulator. For example, the rate converter can convert signals from 30 MHz to 10.546875 MHz (or any other frequency specified by a demodulator), which can be easily programmable. As illustrated in the example of FIG. 1, the output of rate converters #1-#16 can be provided to a first HSIF and the output of rate converters #17-#32 can be provided to a second HSIF.

Figure 2:
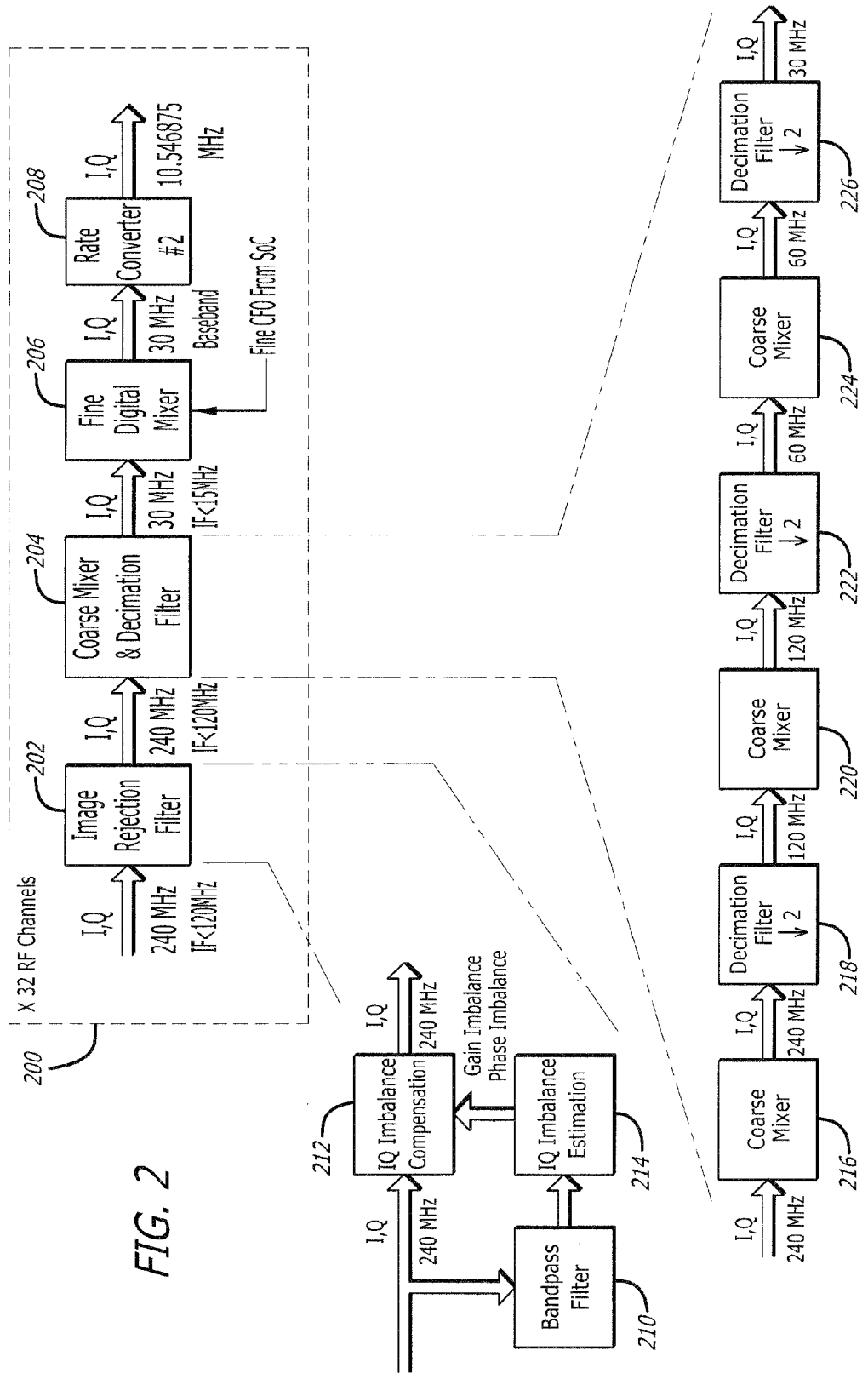
FIG. 2 illustrates an example of a channelizer portion of the DSP for a single RF channel, in accordance with various embodiments.

FIG. 2 illustrates an example of a channelizer portion of the DSP for a single RF channel 200, in accordance with various embodiments. In the illustrated embodiment, the output of the demultiplexer for each channel is provided to an image rejection filter 202. The image rejection filter 202 can be composed of a band-pass filter 210, an IQ imbalance estimation block 214 and an IQ imbalance compensation block 212. The image rejection filter 202 can thus estimate the IQ imbalance for each RF channel separately and to compensate for the IQ imbalance in that channel. The output of the image rejection filter 202 can be provided to a coarse mixer and decimation filter 204 that will perform the down-converting of the signal.

In accordance with an embodiment, the coarse mixer and decimation filter block 204 can be composed of a series of coarse mixers (216, 220, 224) and a series of decimation filters (218, 222, 226) arranged in an alternating sequence. For example, as illustrated in FIG. 2, the signal can be passed to a coarse mixer 216, followed by a decimation filter 218 to down-convert the signal from 240 MHz to 120 MHz. The output of the decimation filter 218 can be provided to coarse mixer 220, followed by decimation filter 222, to down-convert the signal from 120 MHz to 60 MHz. Further, the output signal is provided to coarse mixer 224, followed by decimation filter 226 to down-convert the signal from 60 MHz to 30 MHz. In various alternative embodiments, different numbers of mixers and filters can be implemented within the scope of this disclosure.

In various embodiments, the output of the coarse mixer and decimation filter block 204 can be provided to the fine digital mixer 206 and the output of the fine digital mixer 206 can be provided to the rate converter 208, as previously described with reference to FIG. 1.

Figure 3:
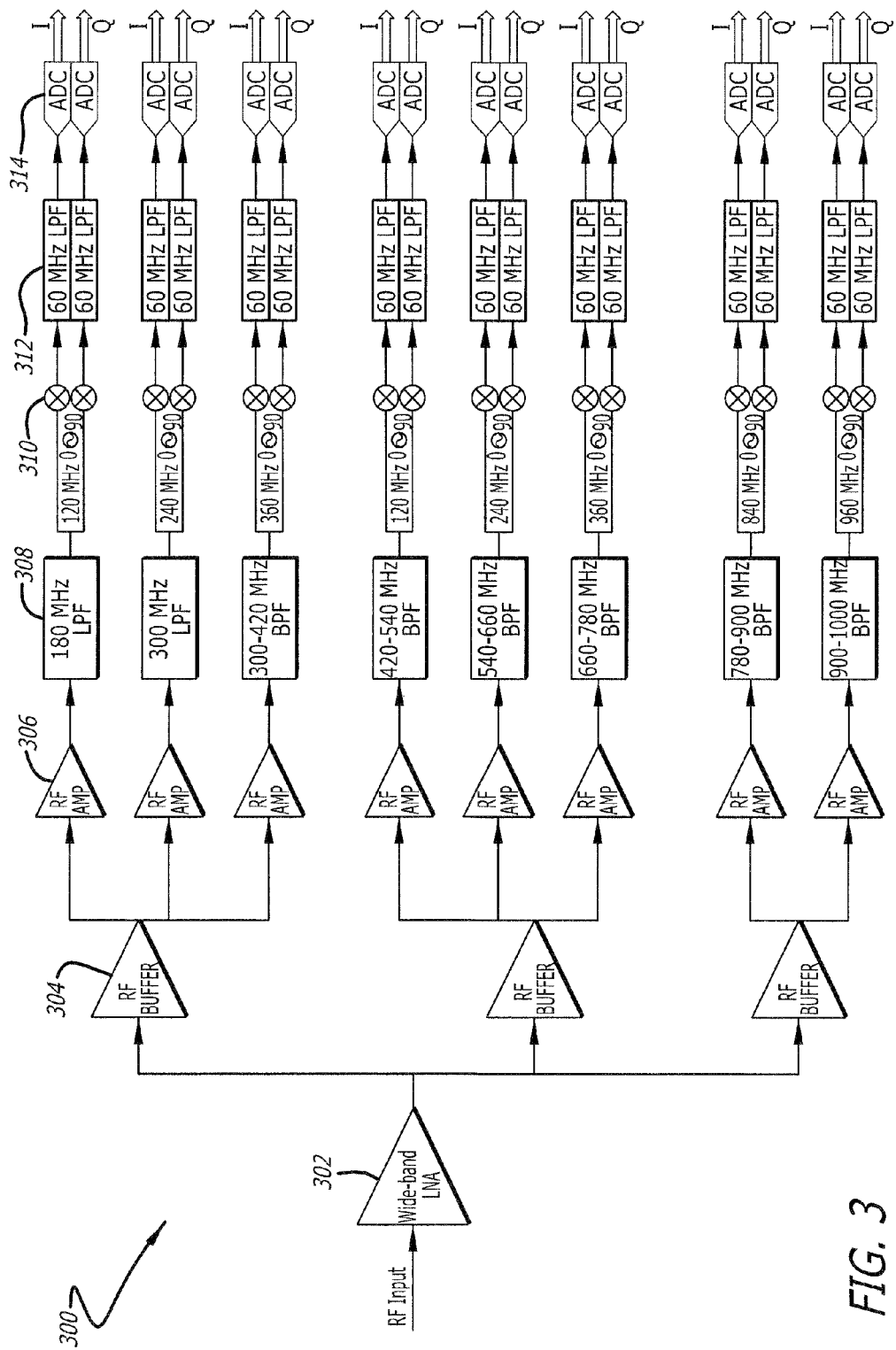
FIG. 3 illustrates an example of the architecture of the RF front-end of the full-band capture cable receiver.

FIG. 3 illustrates an example 300 of the architecture of the RF front-end of the full-band capture cable receiver. As illustrated in the example of FIG. 3, the cable can connect to a wide-band low noise amplifier (LNA) 302 stage that is common to all segments. The cable signal can then be amplified in the second stage acting as an RF buffer 304 for signal distribution purposes. The signal can then be amplified using RF amplifiers 306 and routed to eight (e.g., 2^N) third stages 308 that can either be wideband or composed of LC tanks. The third stage can be wideband for lower frequencies of up to 330 MHz and then it can change to LC tank structure for higher frequencies. The use of LC tanks for higher UHF frequency segments can be particularly useful for cable conditions where there is tilt in the spectrum.

After the third stage, there can be eight HRM mixers, such as mixer 310. The outputs of the mixers can then be routed to a high order butter-worth filter 312 with programmable bandwidth of 50 Mhz to 70 Mhz (e.g., a 60 MHz low-pass filter (LPF)). The output of the filter 312 can be provided to one or more ADCs 314. The ADCs can be selected to work at 240 MHz in the case of eight segments.

The output stream of ADCs can then be received by a Digital Signal Processing unit (DSP unit). The DSP unit can select the desired channels, it can filter the desired channels, and it can compensate for the I/Q imbalance. FIG. 1 and FIG. 2 illustrate the architecture of an example DSP unit.

In various embodiments, the I and Q imbalance rejection can be performed using narrow band filters and narrow band I/Q compensators so that the size and power of the digital circuitry is minimized. With such a method, one of the channels in each segment is filtered smoothly and used to generate gain and phase imbalance coefficients.

Figure 4:
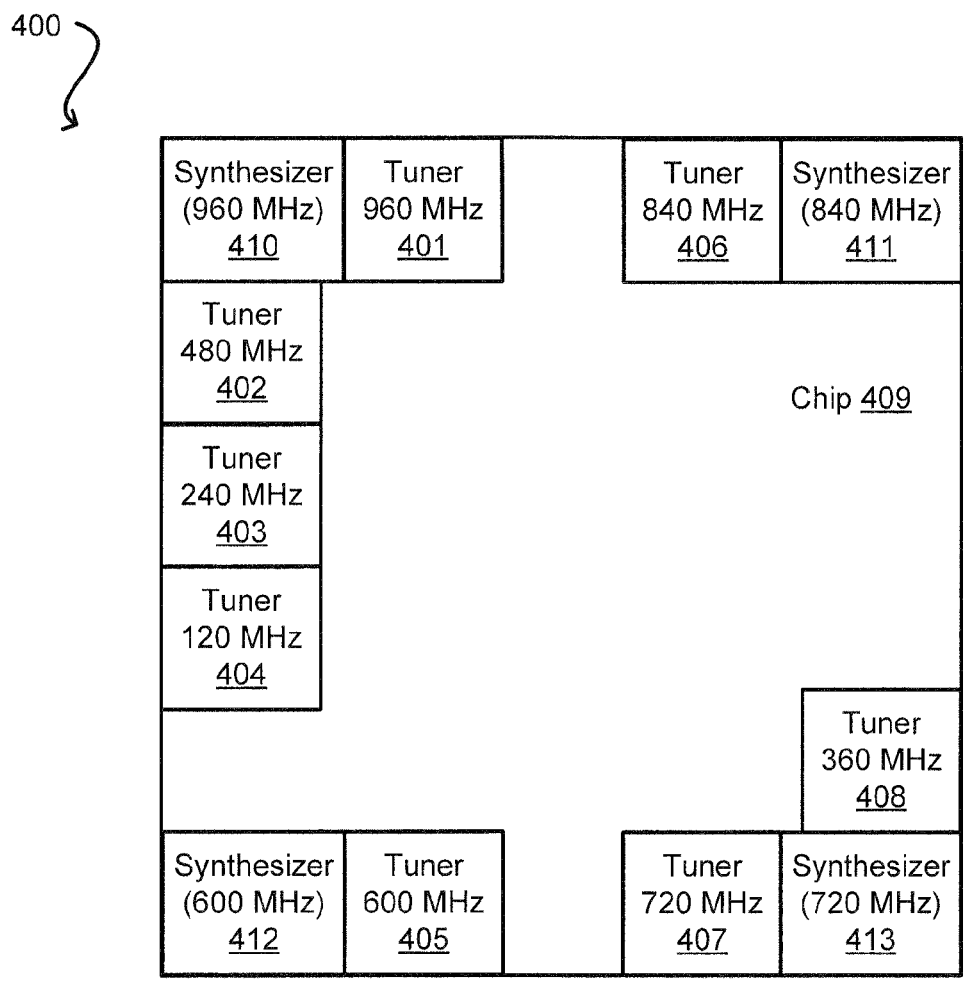
FIG. 4 illustrates an example of using four synthesizers to generate eight frequencies to cover the full cable band, in accordance with various embodiments.

FIG. 4 illustrates an example 400 of using four synthesizers to generate eight LO frequencies to cover the full cable band, in accordance with various embodiments. One possible way to generate eight LO frequencies is to implement eight separate synthesizers. However, because synthesizers produce noise on chip, it may be undesirable to place eight different synthesizers onto a single chip. The noise produced by placing the synthesizers so close to each other may cause interference. In various embodiments, to reduce the number of synthesizers on the chip, a number of simple dividers can be used in conjunction with high frequency synthesizers.

In the illustrated embodiment, the chip 409 includes eight tuners (401, 402, 403, 404, 405, 406, 408, 408) and four synthesizers (410, 411, 412, 413) that produce high frequency signals. Considering a typical 120 MHz bandwidth for every tuner (8×120 MHz) the entire cable band of 960 MHz can be covered using eight tuners. In these embodiments, four independent synthesizers are used to generate eight LO frequencies that are used for eight wideband tuners.

In the illustrated embodiment, the chip 409 includes a 960 MHz synthesizer 410, an 840 MHz synthesizer 411, a 720 MHz synthesizer 413 and a 600 MHz synthesizer 412. In this embodiment, the four tuners that include direct input from the synthesizer are tuner 401 (i.e., 960 MHz tuner), tuner 405 (i.e., 600 MHz tuner), tuner 406 (i.e., 840 MHz tuner) and tuner 407 (i.e., 720 MHz tuner). The other tuners are provided with the signal by using a simple divider. Thus, as illustrated in the example of FIG. 4, the signals for tuners 402, 403, 404 and 408 are provided by dividing the signal synthesized by one of the synthesizers. For example, the signal for tuner 402 (i.e., 480 MHz tuner) is obtained by dividing the signal produced by the high frequency synthesizer 410 by two (i.e. in half). Similarly, the signal for tuners 403 and 404 are obtained by dividing the signal of synthesizer 410 by four and by eight respectively. The signal for tuner 408 (i.e., 360 MHz tuner) is obtained by dividing the signal produced by synthesizer 413 in half. In this manner, eight LO frequencies can be obtained by using only four synthesizers.

In various embodiments, to improve performance for every single TV channel, the LO frequencies are placed in the middle of the frequency gap between two consecutive TV channels. This is performed so that DCOC and all other DC noise, including flicker noise, would not be resident inside any TV channel.

FIG. 5 illustrates an example 500 of a table with LO frequencies obtained by using four synthesizers, in accordance with various embodiments. The illustrated table can be obtained by using a design as described with reference to FIG. 4. As shown in the table, synthesizers #1-#4 can be used to produce signals at 960 MHz, 720 MHz, 840 MHz and 600 MHz respectively. The other LO frequencies can be obtained by dividing LO8 and LO6.

FIG. 6 illustrates an example of dividing the entire cable TV band in the United States into eight segments, in accordance with various embodiments. The table illustrated in this figure shows the left edge and right edge for each segment of the RF frequency range, as well as the left edge, right edge and bandwidth of each BB frequency range for each LO.

Various embodiments discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and the like. The network can be, for example, a local area network, a wide-area network, a virtual private network, the Internet, an intranet, an extranet, a public switched telephone network, an infrared network, a wireless network, and any combination thereof.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. An apparatus for digitizing the full band of a cable signal, the apparatus comprising:
    an input for receiving the cable signal;
    a plurality of tuners configured to receive the cable signal from the input and produce a plurality of frequency segments of the cable signal, wherein each frequency segment covers a portion of the cable signal;
    a plurality of analog-to-digital converters (ADCs) configured to receive the cable signal from the plurality of tuners and produce an output stream, each ADC coupled to a single tuner of the plurality of tuners, wherein each tuner provides the frequency segment of the cable signal to the ADC; and
    a digital signal processor (DSP) configured to receive the output stream from the plurality of ADCs, filter one or more channels of the output stream and compensate the one or more channels for in-phase quadrature (I/Q) imbalance, wherein the DSP further comprises:
    a demultiplexer configured to contain a mapping from the plurality of tuners to a plurality of RF channels;
    an image rejection filter configured to estimate an in-phase quadrature (IQ) imbalance for each RF channel separately and to compensate for the IQ imbalance in the RF channel;
    a channel selection filter configured to filter adjacent channels and interfering RF channels for each RF channel;
    a down converter configured to convert the cable signal into a lower frequency; and
    a rate converter that converts the down-converted signal into a specified frequency for reception at a demodulator.

2. The apparatus of claim 1, wherein the cable signal comprises an entire band from 50 megahertz (MHz) to 1 gigahertz (GHz) frequencies, and wherein the plurality of tuners include eight tuners that subdivide the cable signal into eight frequency segments.

3. The apparatus of claim 1, wherein the DSP produces output data on a first serial bus and a second serial bus, and wherein the output data on the first serial bus contains data for sixteen channels and wherein the output data on the second serial bus contains data for sixteen channels.

4. The apparatus of claim 1, wherein at least one of the plurality of frequency segments is of 120 megahertz (MHz) bandwidth.

5. The apparatus of claim 1, wherein the plurality of frequency segments includes eight frequency segments that are obtained by using four synthesizers.

6. The apparatus of claim 1, wherein the cable signal comprises an entire band from 50 megahertz (MHz) to 1 gigahertz (GHz) frequencies, and wherein the plurality of tuners include at least five tuners that subdivide the cable signal into at least five frequency segments.

7. The apparatus of claim 1, wherein each frequency segment is of at least 50 megahertz (MHz) bandwidth.

8. A method for digitizing a cable signal, the method comprising:
    receiving an incoming cable signal;
    dividing the received cable signal into a plurality of frequency segments, each frequency segment covering a portion of the incoming cable signal;
    passing each frequency segment of the cable signal through a separate tuner of a plurality of tuners, the separate tuner producing an output stream;
    passing the output stream of the separate tuner to an analog-to-digital converter that digitizes the output stream of the separate tuner; and
    passing the digitized output stream from the analog-to-digital converter to a digital signal processor (DSP) configured to filter one or more channels of the digitized output stream and compensate the one or more channels for in-phase quadrature (I/Q) imbalance.

9. The method of claim 8, wherein a full band of the incoming cable signal from 50 megahertz (MHz) to 1 gigahertz (GHz) frequencies is divided into the plurality of frequency segments, the plurality of frequency segments including at least five frequency segments.

10. The method of claim 8, wherein the DSP further comprises:
    a demultiplexer;
    an image rejection filter;
    a channel selection filter;
    a down converter; and
    a rate converter.

11. The method of claim 8, wherein the DSP is coupled to a first serial bus and a second serial bus, and wherein the DSP produces an output signal that carries data for sixteen channels on each of the first serial bus and the second serial bus.

12. The method of claim 8, wherein each frequency segment is of at least 50 megahertz (MHz) bandwidth.

13. The method of claim 8, wherein passing each frequency segment of the cable signal through a separate tuner further includes:
    passing the frequency segment of the cable signal to at least one radio frequency (RF) mixer; and
    passing an output signal of the RF mixer to at least one low-pass filter (LPF).

14. The method of claim 8, wherein dividing the received cable signal into a plurality of frequency segments further includes:
    employing four synthesizers to produce the frequency segments for eight tuners, wherein at least a portion of the tuners are provided with the frequency segment by dividing the frequency produced by one of the synthesizers.

15. A system for digitizing a cable signal, the system comprising:
    an input for receiving the cable signal;
    a low-noise amplifier (LNA) configured to receive the cable signal;
    at least one radio frequency (RF) buffer that receives the cable signal from the LNA and provides the cable signal to a plurality of RF amplifiers;
    a plurality of band pass filters that receive the cable signal from the plurality of RF amplifiers and provide the signal to a plurality of RF mixers;
    a plurality of low pass filters (LPF) that receive the cable signal from the plurality of RF mixers and provide the cable signal to a plurality of analog-to-digital converters (ADCs) that digitize the output stream of the plurality of low pass filters (LPF), and a digital signal processor (DSP) configured to filter one or more channels of the digitized output stream and compensate the one or more channels for in-phase quadrature (I/Q) imbalance.

16. The system of claim 15, wherein the DSP further comprises:
   a demultiplexer configured to contain a mapping from the plurality of ADCs to a plurality of RF channels.

17. The system of claim 16, wherein the DSP further comprises:
   an image rejection filter configured to estimate an in-phase quadrature (IQ) imbalance for each RF channel separately and to compensate for the IQ imbalance in the RF channel.

18. The system of claim 17, wherein the DSP further comprises:
   a channel selection filter configured to filter adjacent channels and interfering RF channels for each RF channel.

19. The system of claim 18, wherein the DSP further comprises:
   a down converter configured to convert the cable signal into a lower frequency.

20. The system of claim 19, wherein the DSP further comprises:
   a rate converter that converts the down-converted signal into a specified frequency for reception at a demodulator.

* * * * *